United States Patent
Lucand et al.

(10) Patent No.: US 6,874,311 B2
(45) Date of Patent: Apr. 5, 2005

(54) CROP RECOVERY MACHINE

(75) Inventors: Philippe Lucand, Melin (FR); Jean Viaud, Gray (FR); Daniel Eric Derscheid, Gray (FR)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/691,371

(22) Filed: Oct. 22, 2003

(65) Prior Publication Data

US 2004/0083704 A1 May 6, 2004

(30) Foreign Application Priority Data

Oct. 24, 2002 (DE) .......................................... 102 49 595
Oct. 24, 2002 (DE) .......................................... 102 49 596

(51) Int. Cl.[7] .............................................. A01D 39/00
(52) U.S. Cl. .......................................... 56/341; 56/364
(58) Field of Search .......................... 56/345, 350, 364, 56/341, 343

(56) References Cited

U.S. PATENT DOCUMENTS

| | | | | |
|---|---|---|---|---|
| 4,803,832 A | * | 2/1989 | Crawford | 56/341 |
| 5,819,516 A | * | 10/1998 | Anderson et al. | 56/341 |
| 5,848,523 A | * | 12/1998 | Engel et al. | 56/341 |
| 5,979,153 A | * | 11/1999 | Roth | 56/341 |
| 6,279,304 B1 | * | 8/2001 | Anstey et al. | 56/341 |
| 6,581,364 B2 | * | 6/2003 | Lucand et al. | 56/341 |
| 6,651,418 B1 | * | 11/2003 | McClure et al. | 56/341 |
| 6,769,239 B1 | * | 8/2004 | Webb | 56/341 |
| 2002/0011061 A1 | | 1/2002 | Lucand et al. | 56/341 |

FOREIGN PATENT DOCUMENTS

| | | |
|---|---|---|
| DE | 37 19 845 A1 | 6/1987 |
| DE | 38 11 649 | 6/1989 |
| DE | 196 16 999 | 6/1989 |
| DE | 43 08 646 A1 | 3/1993 |
| DE | 42 27 194 | 2/1994 |
| DE | 198 06 630 A1 | 2/1998 |
| DE | 100 63 121 | 6/2002 |
| EP | 0 286 776 | 10/1988 |
| EP | 0 659 332 | 6/1995 |
| EP | 1 029 441 | 8/2000 |
| NL | 8 402 830 | 4/1986 |

* cited by examiner

*Primary Examiner*—Thomas B. Will
*Assistant Examiner*—Nathan Mammen

(57) ABSTRACT

A large round baler is provided with a crop take-up arrangement as well as a knife shaft ahead of the inlet of a baling chamber which carries knives that cooperate with blades of a first rotor to cut crop material into pieces before the first rotor delivers the crop directly into the baling chamber. A second rotor is provided between the take-up rotor and the first rotor shaft for narrowing the crop flow from that of the crop take-up arrangement to that of the first rotor. All of the rotors perform an overshot conveying that requires a relatively low drive energy and guarantees a continuous flow of the crop into the chamber.

13 Claims, 17 Drawing Sheets

CROP RECOVERY MACHINE

FIELD OF THE INVENTION

The invention concerns a crop recovery machine including an arrangement for taking up crop and a conveying arrangement, including an overshot conveying rotor associated with, and for conveying the crop into, an inlet of a crop receptacle.

BACKGROUND OF THE INVENTION

A large baler with an arrangement for taking up agricultural cereal crop lying on the ground is known from DE 37 19 845 A1. This large baler is provided with a conveying channel with an intermediate conveyor that is equipped with drivers. Each driver of the intermediate conveyor is associated with one knife of a plurality of knives carried by a knife shaft of a cutting arrangement. The knife shaft conveys the harvested crop as an overshot conveyor, while the intermediate conveyor rotates in the opposite direction to the knife shaft and is arranged at an angle above it.

A large round baler with a crop take-up arrangement arranged underneath a baling chamber and a knife shaft conveying as an overshot conveyor is known from WO 92/09191. Between the crop take-up rotor and the knife shaft, an intermediate pulley is arranged that is supported in bearings, free to rotate, and driven by the flow of the crop, in order to support trouble-free conveying of the crop.

Furthermore, a large round baler with a take-up rotor as an overshot conveyor and a knife shaft as an undershot conveyor is known from DE 43 08 646 A1. Between the shafts of the crop take-up rotor and the knife shaft, driven in opposite directions, a further rotor is provided that is driven by the flow of the crop to assure a trouble-free flow of the crop. The further rotor rotates in the opposite direction from the take-up rotor and in the same direction as the knife shaft.

Finally, a baler for agricultural cereal crops is described in DE 198 06 630 A1. This baler is provided with a take-up rotor arranged in the direction of the flow of the crop ahead of a baling chamber that is followed by a reducing arrangement that consists of an overshot conveying rotor in the form of a knife shaft functioning as a cutting rotor, shear bars and strippers. Located between the take-up rotor and the cutting rotor, is a transverse screw conveyor that concentrates the cereal crop to the width of the rotor or the baling channel, with the screw conveyor being arranged and equipped with lines, and which operates as an undershot conveyor, that transfers the harvested crop to the overshot cutting rotor.

The balers described above have the common disadvantage that no reliable crop flow can be guaranteed with the known arrangements for the conveying of harvested crop between the take-up rotor and baling chamber.

The problem underlying the invention is seen in the need to guarantee a reliable crop conveying that is free of jams to or in a baling chamber of a large round baler.

SUMMARY OF THE INVENTION

According to the present invention, there is provided an improved crop conveying arrangement for delivering windrowed crop to the inlet of a crop recovery machine, such as the inlet of a baling chamber of a large round baler.

An object of the invention is to provide a conveying arrangement, for the purpose noted above, wherein the material is conveyed in a continuous mass without high frictional forces.

This object of reliably conveying the material to be pressed from the pickup to the press chamber is achieved by the overshot conveyance of the two rotors preceding the press chamber, since this prevents high frictional forces at the conveyor bottom so that the material conveyance power requirement is reduced. With respect to the first and the second rotor, it should be mentioned that the term "rotor" refers to any structural component with rigid or movable drivers, or with a smooth surface, that rotates about an actual or imaginary axis.

The realization of the first rotor in the form of a cutting rotor provides the advantage that the material to be pressed can be better compacted before the pressing process and results in a smaller volume.

The arrangement of an overshot conveying rotor at an inlet of collecting or baling chamber of a crop recovery machine configured as a large round baler, large square baler, self-loading forage box, or the like, for example, is configured according to the invention in such a way that a circumferential region a the rotor reaches at least to the region of the collecting chamber. This arrangement has the advantage that a secure crop flow that is free of jams is made possible between the crop take-up arrangement and the collecting chamber. When used wit a large round baler, a first rotor is arranged immediately at the inlet of the baling chamber, and preferably is an overshot cutting rotor. The arrangement of enclosing circumferential surfaces or the cutting surface of the cutting rotor and an enclosing section of the baling chamber, that simultaneously defines the outer circumference of a cylindrical bale that is to be baled, assures a reliable supply of the harvested crop to the baling chamber. The enveloping ends may, for example, touch each other tangentially or be spaced slightly apart from each other. However, if necessary, they may overlap slightly.

The first rotor arranged at the inlet of the baling chamber, that is preferably configured as a cutting rotor, is preferably preceded by a crop take-up arrangement. Here the crop take-up arrangement may have a greater width than the first rotor. In this case, a transverse conveying arrangement can be provided to condense or narrow the flow of the crop passing between the crop take-up arrangement and the cutting rotor. Here, the crop conveying and the transverse conveying are largely separated so that a better processing of peaks in the supply of the crop taken up is possible.

The term rotor does not refer only to a rotational solid that rotates about an axis. On the contrary, the first and the second rotor may also consist of a structural component that rotates about one or more axes, e.g., a driver assembly on a crank shaft, in a cam track, etc. This driver assembly, e.g., with fork elements, may certainly also be adjustable radially with reference to an actual or an imaginary axis of rotation.

The first rotor is preferably preceded by at least one second rotor located upstream, which in turn, is located downstream of the crop take-up arrangement.

If the second rotor and the pickup have the same width, the latter only needs to convey a relatively thin mat, so that clogging is prevented or at least reduced.

If the first rotor has a smaller width than the second rotor, it is ensured that the transfer into the press chamber will take place not in an excessively abrupt fashion, and therefore in a more reliable fashion.

Preferably, the pickup as well as the first and the second rotor convey the received harvest in an overshot fashion. Due to this measure, the rotors only require a relatively low driving energy and are still able to reliably convey the received material from the ground to the press chamber of the baling press. Within the conveying distance, conveyance takes place with only slight wave motions, so that a significantly smoother material flow with fewer obstructions can be achieved.

Furthermore, the second rotor may be provided in each of its outer sections at least with a transverse conveying arrangement having an axially inward conveying component. It may be configured, for example, as a screw conveyor or equipped with helical bridges.

Furthermore, the second rotor may be provided with a central section with drivers arranged thereon. The drivers may be configured, for example, as fingers, tines, driver bridges, and/or paddles. Alternatively, the drivers may also be configured as helical windings.

An embodiment of the invention provides that at least the outer sections of the second rotor be driven. If necessary, the second rotor may consist entirely of the driven outer sections, without containing any central section. Alternatively, the second rotor may be brought into rotation only by the flow of the crop. The optional drive of at least the outer sections of the second rotor may be performed, for example, by means of chain or belt drives. If necessary, the second rotor may be provided with a hydraulic or pneumatic drive.

According to a further embodiment of the invention, a guide arrangement is located between the second rotor and the first rotor that preferably is flexible. The guide arrangement may be configured, for example, as a flap, as a roll and/or as a conveyor belt. By means of the second rotor, larger accumulations of cereal crop are pulled apart, whereby the harvested crop is loosened up and distributed more evenly. With larger agglomeration of harvested crop, these are forced against the possibly flexible guide arrangement with relatively low friction, and if necessary, pre-compressed there. The portions of pre-compressed accumulated harvested crop can then easily be reduced by the cutting rotor. The cutting rotor requires only a relatively small amount of drive energy. The conveyor arrangement according to the invention operates at a very favorable overall efficiency, and therefore does not require any large amount of additional energy for its drive, which would have to be supplied from the towing vehicle.

In particular, in the case of the configuration of the crop recovery machine as a large round baler with a variable baling chamber, or such a one that is, for example, surrounded by belts, bar chains, movable rolls or the like, the advantages of the overshot first rotor are fully realized, since the initial formation of the bale in a variable baling chamber is difficult.

The arrangement of a rotor conveying in an overshot fashion at the inlet of a press chamber of a round baler is realized, according to the invention, such that a circumferential region of the rotor extends at least to a circumferential region of the press chamber. This provides the advantage that a reliable material flow without clogging can be achieved between the pickup and the press chamber of the round baler. The first rotor that is arranged directly at the inlet of the press chamber is preferably realized in the form of a cutting rotor that conveys in an overshot fashion. The adjacent arrangement of the envelope or generated surface of the cutting rotor and an enveloping section of the press chamber, which at the same time defines the outer circumference of a round bale to be pressed, ensures a reliable transport of the crop to the press chamber. The envelopes may, for example, make tangential contact or be slightly spaced apart from one another. If so required, they may also slightly intersect.

An aggressive conveying performance of the crop to be baled is attained by the first and/or the second rotor that is, or are, configured as a rotating body, or rotating bodies, circulating about an actual or imaginary axis equipped with forks, tines, fingers or the like.

If the second rotor can be moved transverse to the flow of the crop, for example, pivoted on arms sliding in guides, it can perform an adequate pre-compression of the crop to be baled either alone, or in addition to the repositioning of a guide vane, which improves the conveying process.

BRIEF DESCRIPTION OF THE DRAWINGS

The drawing shows an embodiment of the invention that shall be described in greater detail in the following.

DESCRIPTION OF THE PREFERRED EMBODIMENT

Figure 1:
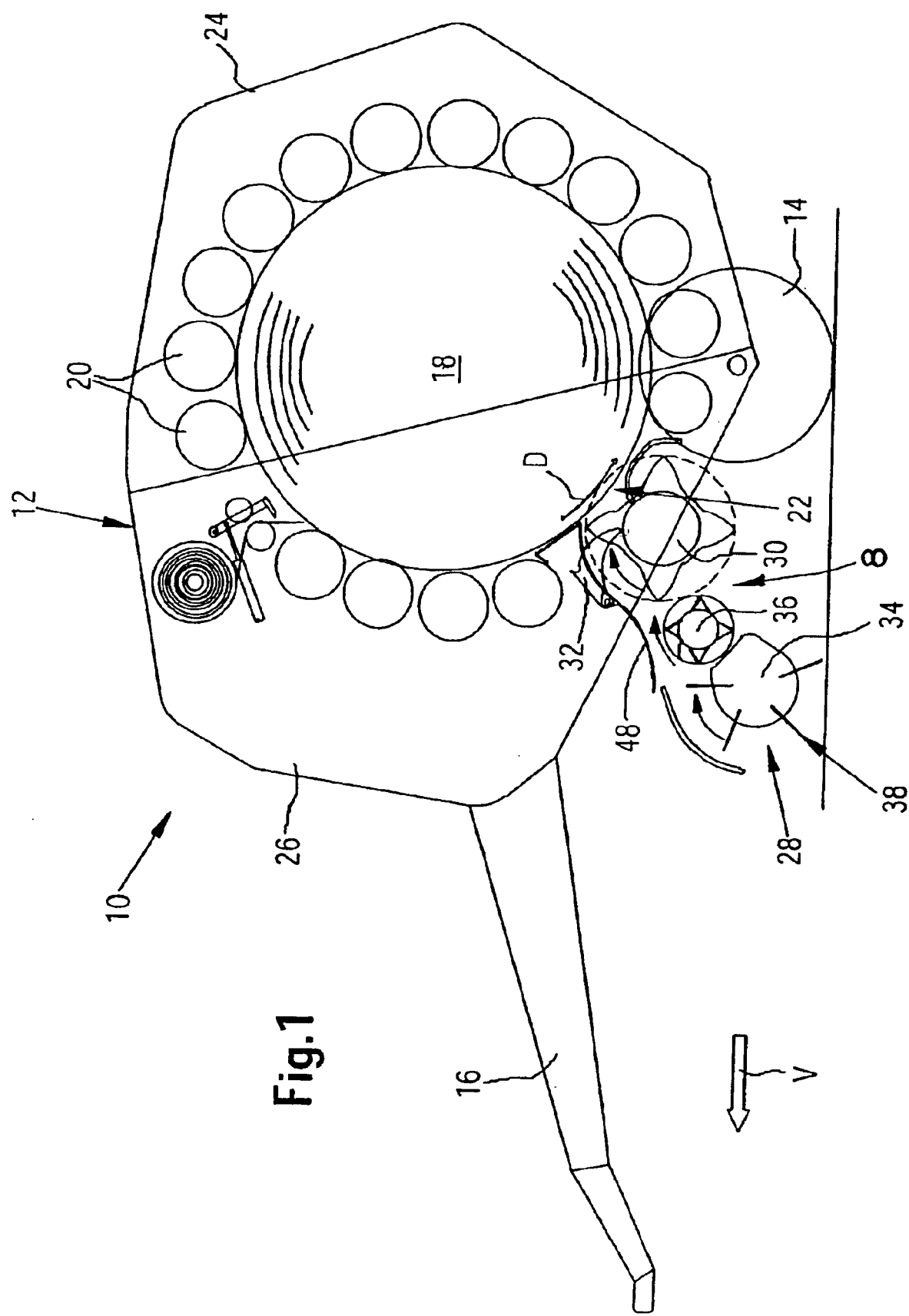
FIG. 1 is a schematic, left side view of a crop recovery machine, here depicted as a large round baler, with a crop take-up arrangement attached at the front.

FIG. 1 shows a crop recovery machine in the form of a large round baling press or baler 10 with a crop take-up arrangement 28 at a forward lower side that extends over the entire operating width of the baler 10, and a conveying arrangement 8.

In the present embodiment, the baler 10 is configured as a large round baler, but could also be a self-loading forage box, a large square baler or the like, in which the crop taken up is reduced.

The baler 10 is of a known configuration and includes a frame 12 that is supported by wheels 14 on the ground and that can be coupled by a towbar 16 to a towing vehicle, not shown. Furthermore, the frame 12 carries a baling chamber 18 that is surrounded by rolls 20 and is provided with an inlet 22. The rolls 20 are arranged on a circular arc and include a first plurality of rolls 20 located in a discharge gate 24 that can be pivoted vertically and with a second plurality of rolls 20 located in a rigid housing 26. The direction of rotation of a cylindrical bale being formed in the baling chamber 18 is counterclockwise, as indicated by an arrow D. The crop take-up arrangement 28 is located ahead of the inlet 22 at the underside of the housing 26, and is followed downstream by the cutting arrangement 32.

The operation of the baler 10 consists of taking up harvested crop from the ground, usually grass, hay or straw, by means of the crop take-up arrangement 28, cutting the crop into small pieces by means of the cutting arrangement 32, and conveying the crop into the baling chamber 18, where it is baled into a compact bale. By opening the discharge gate 24, the bale is delivered to the ground and can be processed further.

Generally, the cutting arrangement 32 is also of a known configuration including a frame, not shown here, as well as a conveying surface, knives, and knife positioning and/or sensing, if necessary.

Figure 2:
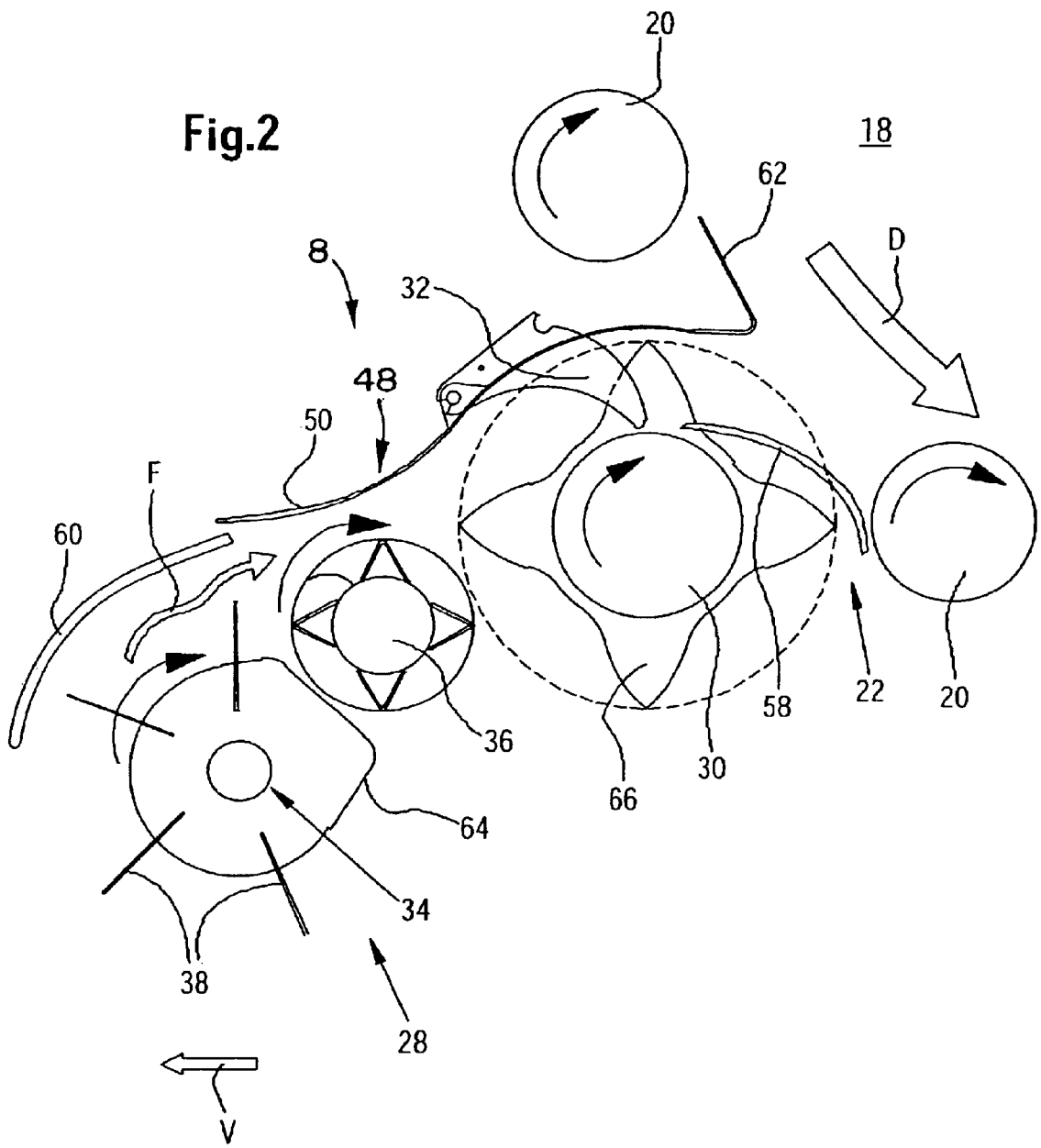
FIG. 2 is an enlarged left side view of the crop take-up arrangement, with its conveying components, as shown in FIG. 1.

FIG. 2 shows a schematic side view of the conveying arrangement 8, with a first overshot rotor 30, that in the embodiment shown, is configured as a cutting rotor and is provided with a multitude of drivers 66, arranged in transversely spaced relationship alongside each other, and that extend between or engage the knives of, the cutting arrangement 32. In order to strip the cut harvested crop from the first rotor 30 and to convey it reliably into the baling chamber 18, strippers 58 are provided in each case on the cutting arrangement 32, that engage in the intervening spaces between the drivers 66.

The first rotor 30 is preceded upstream by a second rotor 36 with a smaller diameter than the first rotor 30, whose operation and configuration is explained in greater detail on the basis of the following figures.

The crop take-up arrangement 28 itself is located ahead of the second rotor 36 and consists essentially of a row of rotating take-up tines 38 that are fastened to a take-up rotor 34. The take-up tines 38 of the take-up rotor 34, the first rotor 30, and the second rotor 36 each rotate in the clockwise direction in the illustration shown so that each conveys in an overshot manner. The conveying direction of the harvested crop is indicated by an arrow F. The direction of advance of the crop recovery machine 10 is indicated by an arrow V. Furthermore, it can be seen clearly that the ends of the first rotor 30, that is configured as a cutting rotor, trace a circle that is close to a circle that is tangent to inner surfaces of the bale-forming rolls 20 surrounding the baling chamber 18. If necessary, these circles may touch or even overlap slightly. The direction of rotation of a cylindrical bale to be formed is indicated by the arrow D.

Inclined above, and extending just up to the crop take-up arrangement 28, is a guide vane 60 that is curved about and spaced a defined distance from, a circle of rotation of the rotating take-up tines 38. The spacing between the guide vane 60 and the take-up rotor 34 defines the take-up volume of the crop take-up arrangement 28. The guide vane 60 is followed downstream by a guide arrangement 48 that is configured here as a flap 50. The guide arrangement 48 is followed by the cutting arrangement 32 inclined above the first rotor 30. The guide vane 60 is in the form of an arc extending approximately between 9 o'clock and 12 o'clock position above the take-up rotor 34. The guide arrangement 48 is located so as to span a gap between a rear end of the guide vane 60 and the cutting arrangement 32. Thus, the guide arrangement 48 is spaced above the second rotor 36.

Furthermore, a guide 62 is provided, for example, in the form of a guide vane or the like, arranged between the first rotor 30 and an adjacent one of the rolls 20, which is arranged above the first rotor 30, and defines an upper boundary of the inlet 22. In this position, the vane 62 prevents a forming cylindrical bale from pressing against the blades of the first rotor 30 from above, and thus, from impairing the conveying of the crop between the cutting arrangement 32 and the first rotor 30. These rotors 30 and 36, as described here, form the conveying arrangement 8 that perform overshot conveying, assure a flow of the crop without defects, and are distinguished by requiring only a small drive energy.

Figure 3:
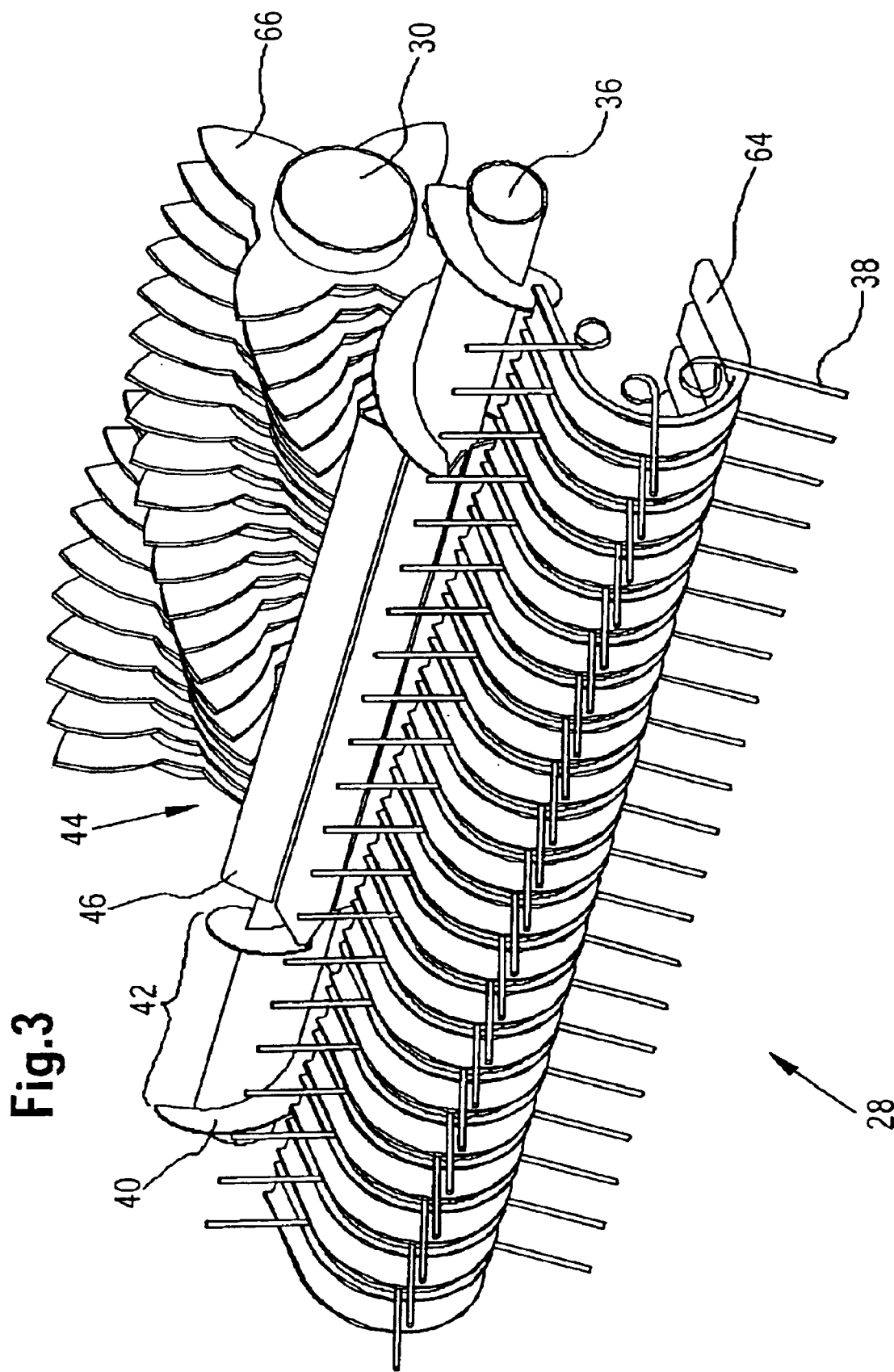
FIG. 3 is a schematic, left front perspective view of the essential components of the conveying arrangement according to the invention.

FIG. 3 shows a schematic perspective view of the arrangement of the rotors of the conveying arrangement to each other. The crop take-up arrangement 28 with its rotating take-up tines 38 is followed by the second rotor 36 located along a path inclined upwardly from front to rear from the rotor 34 of the crop take-up arrangement 28. The second rotor 36, in turn, is followed by the first rotor 30 that is provided with a driver shaft and a number of drivers 66 spaced away from each other.

Each of the crop take-up tines 38 of the crop take-up arrangement 28 extend between U-shaped sheet metal frame components 64 that envelop the take-up rotor 34 towards the front and prevent longer stalks of cereal crop from becoming entangled in the suspensions of the tines on the take-up rotor 34. The crop take-up arrangement 28, that performs overshot conveying, transfers the crop to the second rotor 36 that also performs overshot conveying and that consists generally of three axially adjacent sections.

A central section 46 is configured as a tangential conveying arrangement. Each of two outer sections 42 are configured as transverse conveying arrangements. To each of the outer sections 42, bridges are applied in the form of helices 40, that apply an axial conveying component to the harvested crop in the direction towards the central section 44. The second rotor 36 can either be driven passively by the harvested crop or driven actively, for example, by a belt or a chain drive.

The second rotor 36, that conveys the harvested crop in an overshot manner, transfers it to the first rotor 30, which has a clearly smaller operating width than that of the second rotor 36. The first rotor 30 cuts up the harvested crop and subsequently conveys it into the baling chamber (not shown). Each of axially spaced plate members of the first rotor 30 are provided with four drivers 66 that each have a curved contour. The drivers 66 of adjacent plate members are arranged slightly offset to each other, so that overall a helical outer contour of the edges of the drivers 66 results. This helical contour produces a lighter cut, since not all drivers simultaneously pass the knives of the cutting arrangement 32, but an offset cut results.

Figure 4:
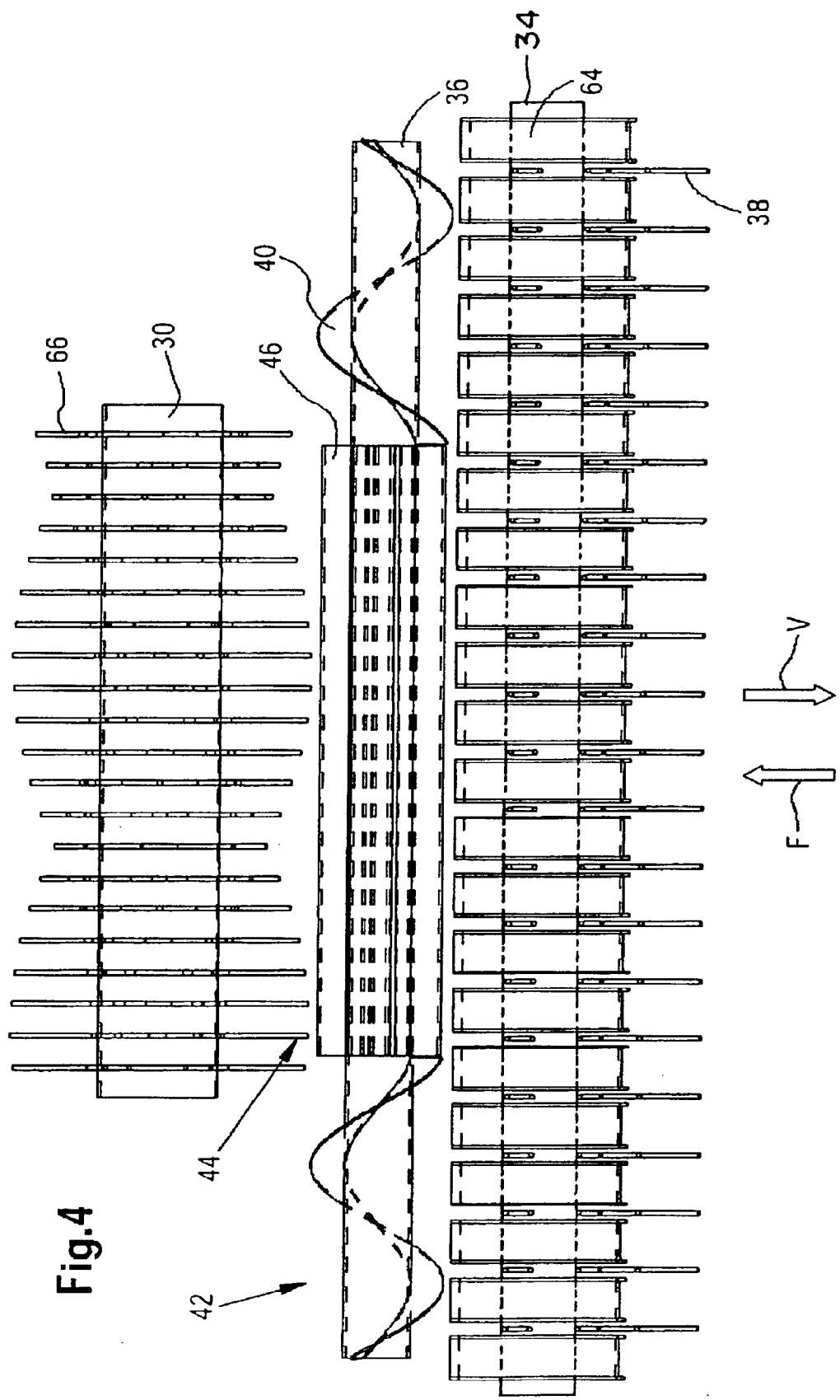
FIG. 4 is a schematic plan view of the conveying arrangement of FIG. 3.

The schematic plan view of FIG. 4 clearly shows the arrangement and configuration of the three rotors 30, 34, 36 that are arranged with the first rotor 30 behind the second rotor 36 and the second rotor 36 behind the take-up rotor 34 and with each of the rotors performing overshot conveying. As indicated by the arrows, the direction of advance V is opposite to the conveying direction F. The second rotor 36 is preferably provided with at least the same operating width as the crop take-up arrangement 28. The first rotor 30 is provided with an operating width that corresponds, at a minimum, to the operating width of the central section 44 of the second rotor 36. Thereby, the outer sections 42 of the second rotor 36 with their helices 40 provide the transverse conveying components in the direction towards the central section 44 so that the first rotor 30 can grasp the harvested crop and cut it.

Figure 5:
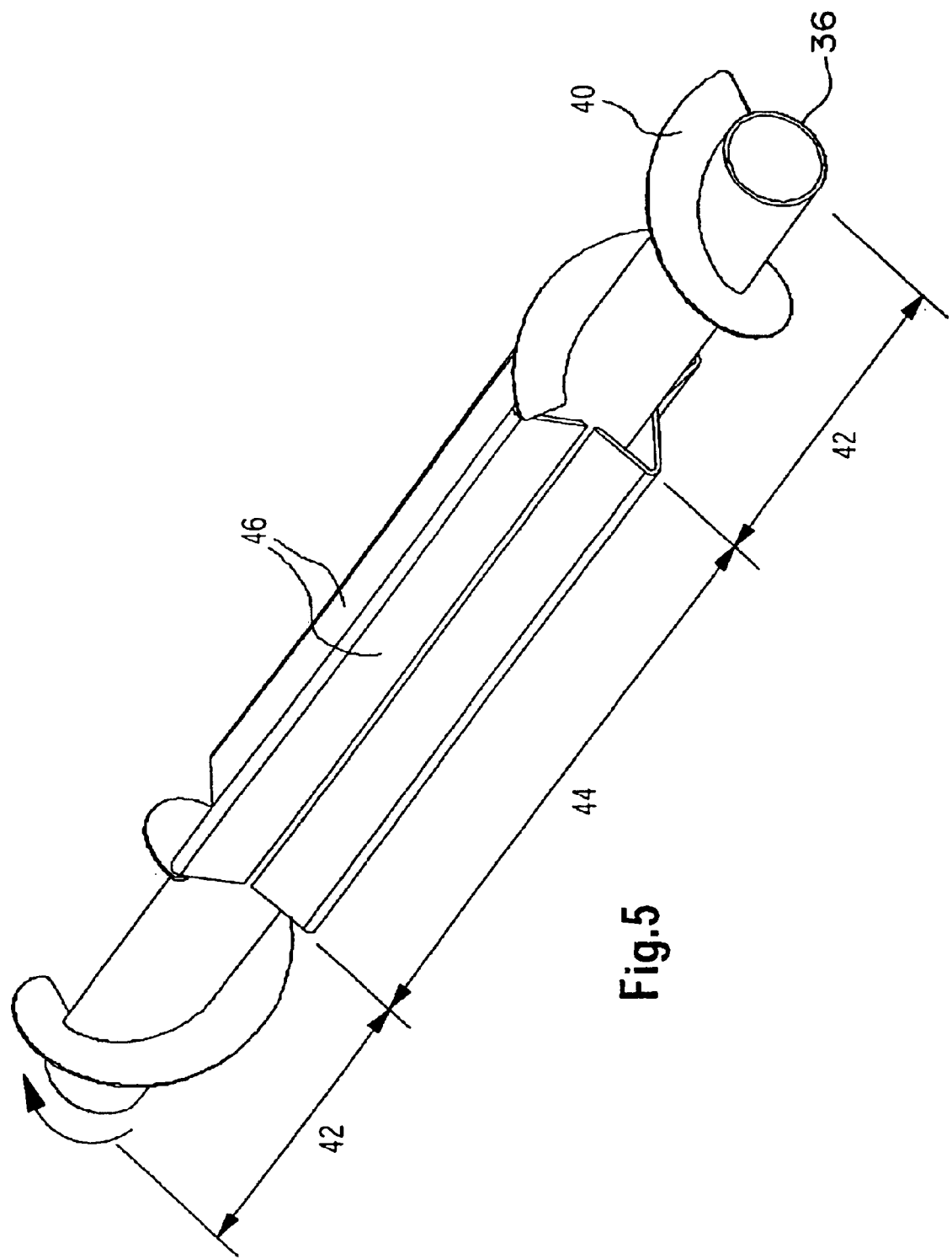
FIGS. 5 through 7, respectively show schematic perspective views of three alternative variations of a rotor of the conveying arrangement, according to the invention.

A first variation of the second rotor 36 is clarified on the basis of the perspective schematic view of FIG. 5. Each of the outer sections 42 are provided with a screw conveyor 40 that provides an axial conveying component in the direction towards the central section 44 with an overshot conveying corresponding to the direction of rotation shown in the drawing. The central section 44 is provided with a row of driver bridges 46 extending parallel to the axis of rotation that provide an adequate transmission of movement to the rotor 36 when it is being driven passively by crop passing over it.

Figure 6:
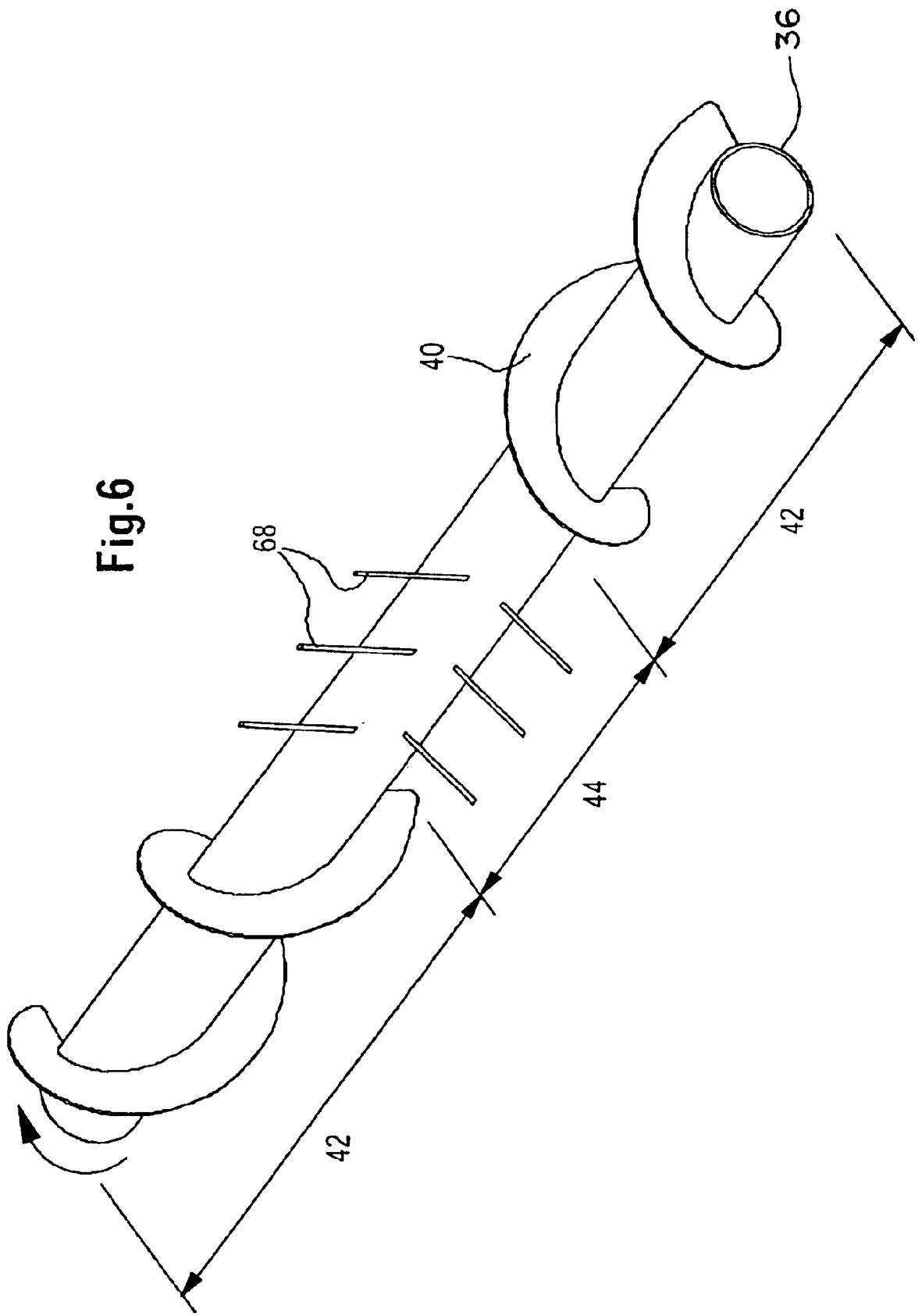

In place of the driver bridges 46, the central section 44 can also be equipped with driver tines 68 extending radially outward, as shown in FIG. 6. The driver tines 68 may be configured, for example, as steel pins or as pins suspended on springs. However, the driver tines 68 may also consist in an advantageous embodiment of a material that is at least partially flexible, for example, a fabric-reinforced rubber or the like. Preferably, the driver tines 68 are configured as interchangeable in order to assure an easy replacement in case wear is encountered or damage occurs.

Figure 7:
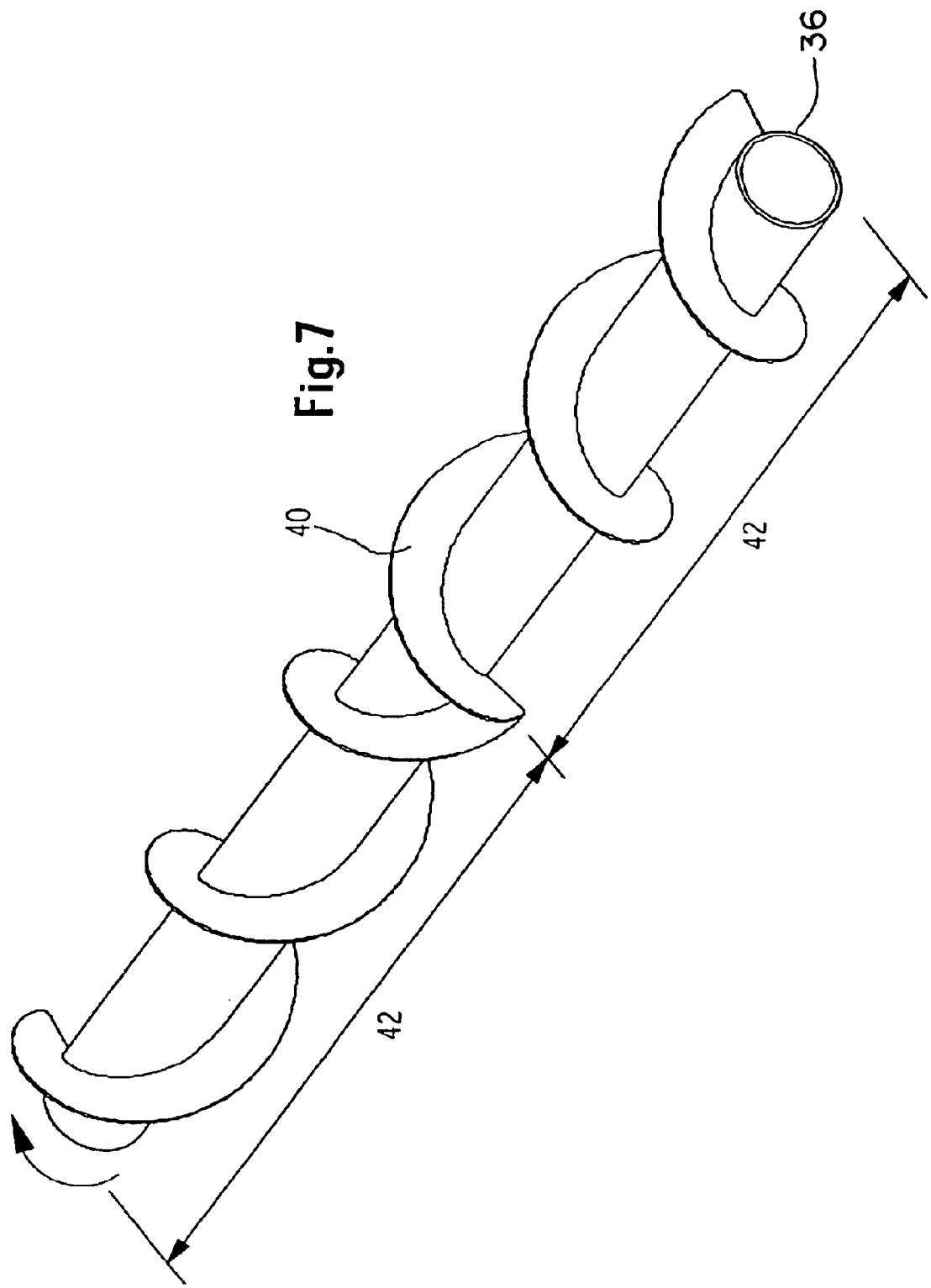

Furthermore, in an alternative embodiment of the second rotor 36, the central section 44 may be connected to the outer sections 42 without any transition or the central section may be omitted, as shown in FIG. 7. Here, the helices 40 extend from the outer edges of the outer sections 42 to the center of the second rotor 36 and meet there. Such an embodiment can provide a more uniform distribution of the harvested crop over the entire operating width of the first rotor 30.

Corresponding to FIGS. 5 through 7, the second rotor 36 can be brought into rotation passively or actively. An active drive can provide, for example, a variable rotational speed that can be controlled, for example, on the basis of sensor magnitudes that represent a volume of harvested crop taken up.

Figure 8:
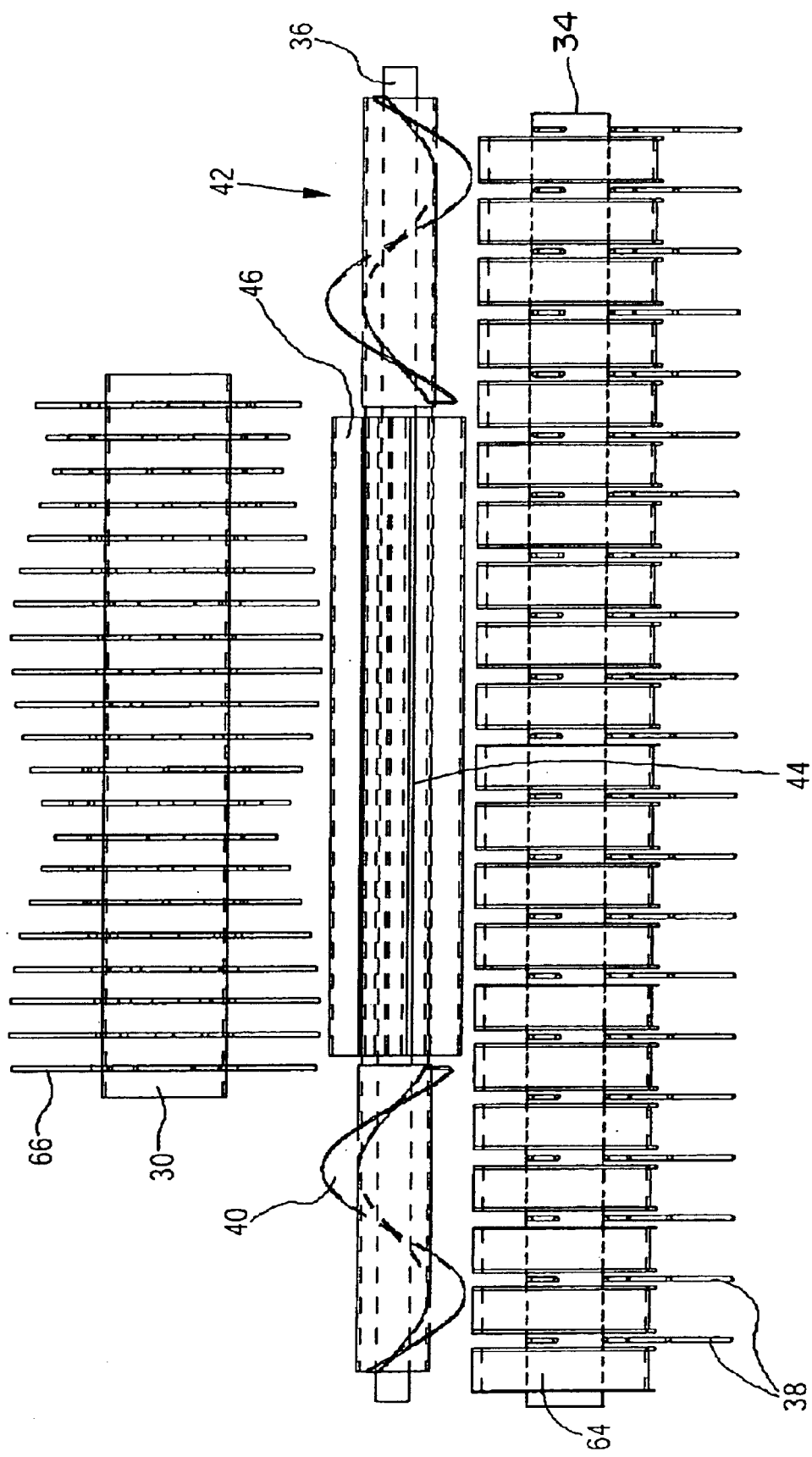
FIG. 8 is a schematic plan view of a variation of the conveying arrangement shown in FIG. 4.

FIG. 8 shows a further alternative of the conveying arrangement according to the invention, in which the second rotor 36 consists of at least two parts separated from each other. In the embodiment shown, the two outer sections 42 are equipped with the transverse conveying arrangements in the form of the helices 40, that were previously explained, and in each case are driven actively. The central section 44 is equipped with the driver bridges 46 that were previously explained, and is not provided with any drive of its own, but is brought into rotation by the harvested crop. The axes of rotation of the outer sections 42 and of the center section 44 are preferably aligned with each other, as shown in FIG. 8. In particular, the outer sections 42 and the central section 44 may be arranged on a common shaft or axis.

Here, the outer sections 42 provide for a defined or a variable flow of the crop in the transverse conveying direction by means of a defined fixed or variable rotational speed so that at all times a reliable charging of the first rotor 30 with harvested crop can be attained.

Figure 9:
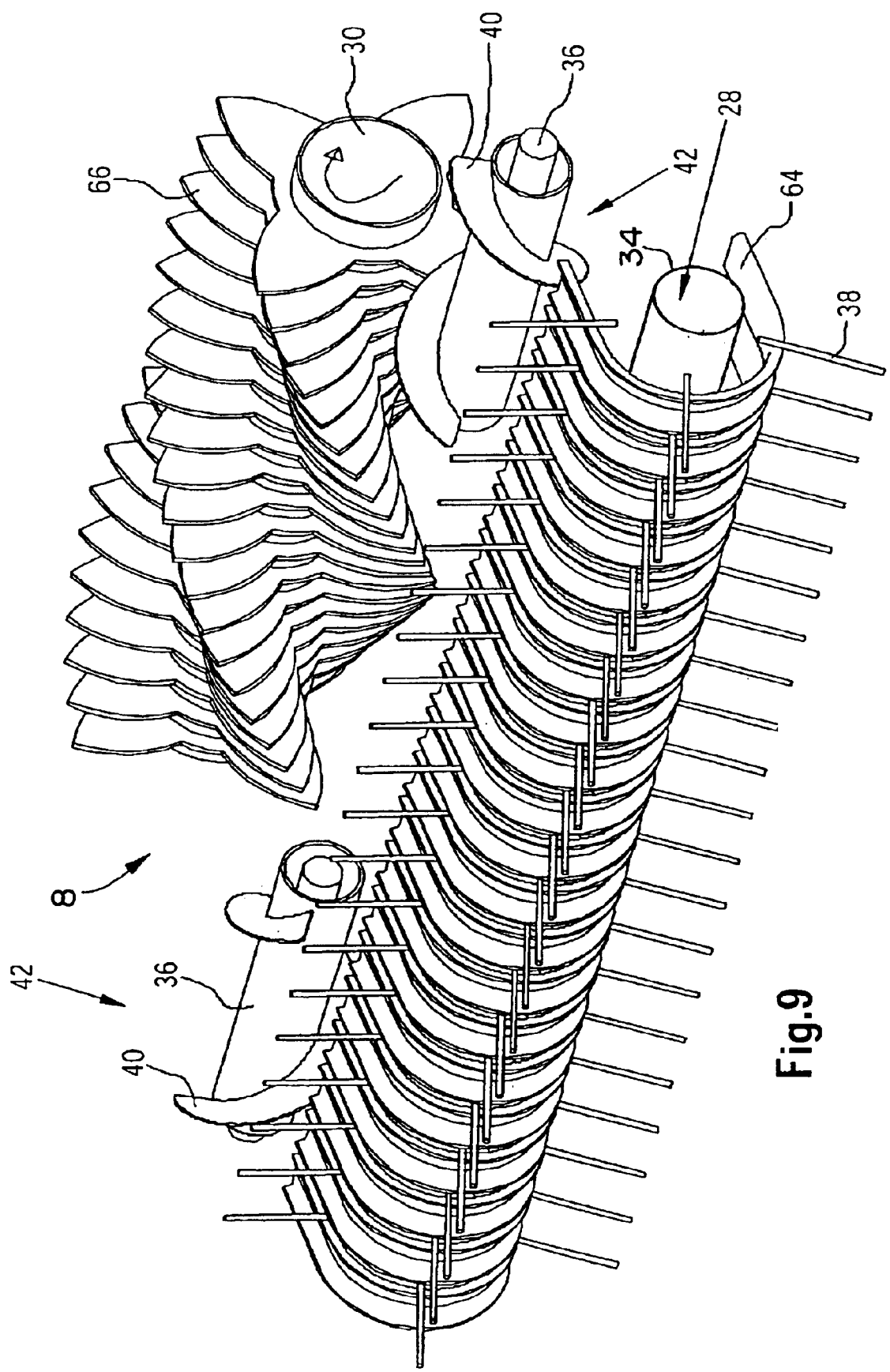
FIG. 9 is a schematic perspective view like FIG. 3, but showing an alternative embodiment of the second rotor.

FIG. 9 shows a further variation of the conveying arrangement 8, in which the central section 44 of the second rotor is completely omitted. If necessary in this embodiment, the drivers 66 of the first rotor 30 may be provided in each case with a slightly larger outer diameter so that at all times a secure takeover of the harvested crop between the take-up rotor 34 and the first rotor 30 is assured.

The omission of the central section of the second rotor 36 is made more favorable by its relatively smaller outer diameter, since in this way the take-up rotor 34 can be arranged relatively close to the first rotor 30. Thereby, the danger that harvested crop falls down between the take-up rotor 34 and the first rotor 30 and leads to a jam, is relatively low. Furthermore, the rotors 30, 34, 36 rotate at relatively high speeds so that the harvested crop is thrown from the take-up tines 38 in the direction of the first rotor 30.

Figure 10:
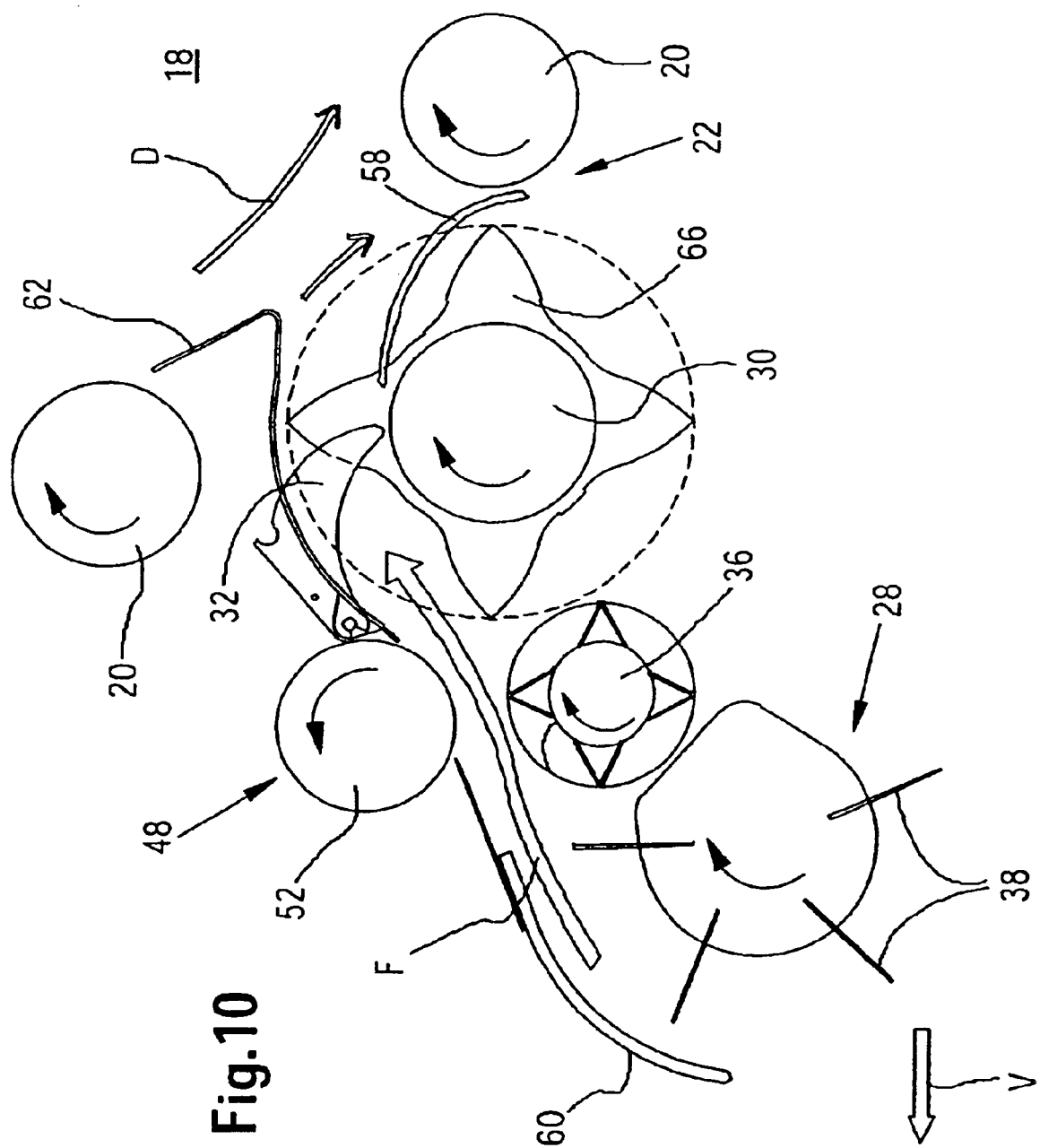
FIGS. 10 through 17 show schematic side views respectively of various alternative embodiments of the guide arrangement associated with the conveying arrangement.
Figure 11:
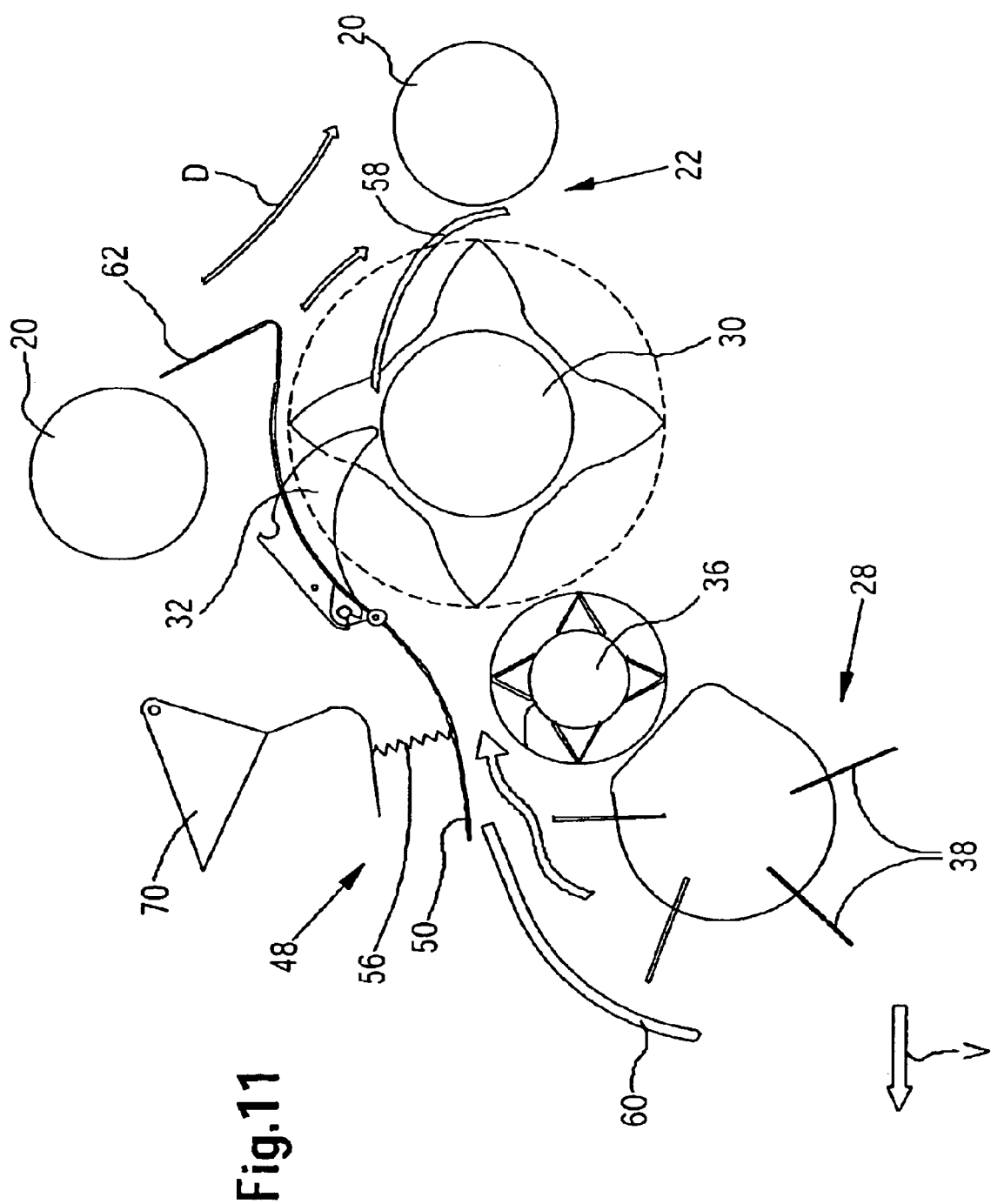

Furthermore, FIG. 10 shows a schematic side view of a variation of the conveying arrangement in which the guide arrangement 48 consists generally of a roll 52 directly above the second rotor 36. The roll 52 is preferably arranged free to rotate and rotates in the case of a conveying direction F of the harvested crop in the opposite direction to the direction of advance V of the crop recovery machine 10 and opposite to the direction of rotation of the rotors 30, 36, 34. Alternatively, the guide arrangement 48 may also be formed by a spring-loaded flap 50, as this is clarified on the basis of FIG. 11. On its rear side, the flap 50 is provided in this case with a spring 56 configured as a contact pressure spring, that if necessary, can be varied in its spring force by means of a positioning arrangement 70. The spring 56 is preferably supported on the frame 12 of the crop recovery machine 10.

Figure 12:
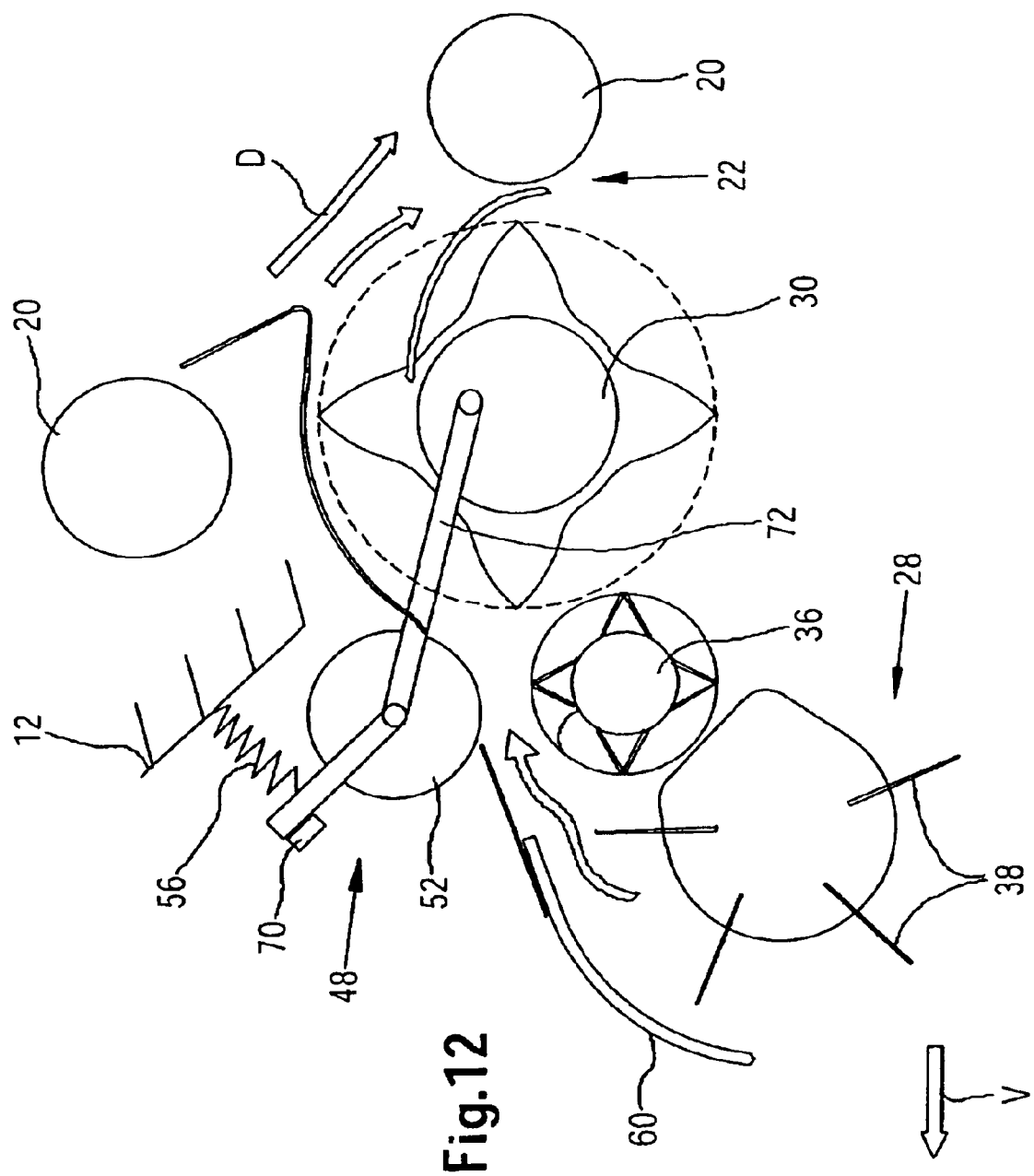
Figure 13:
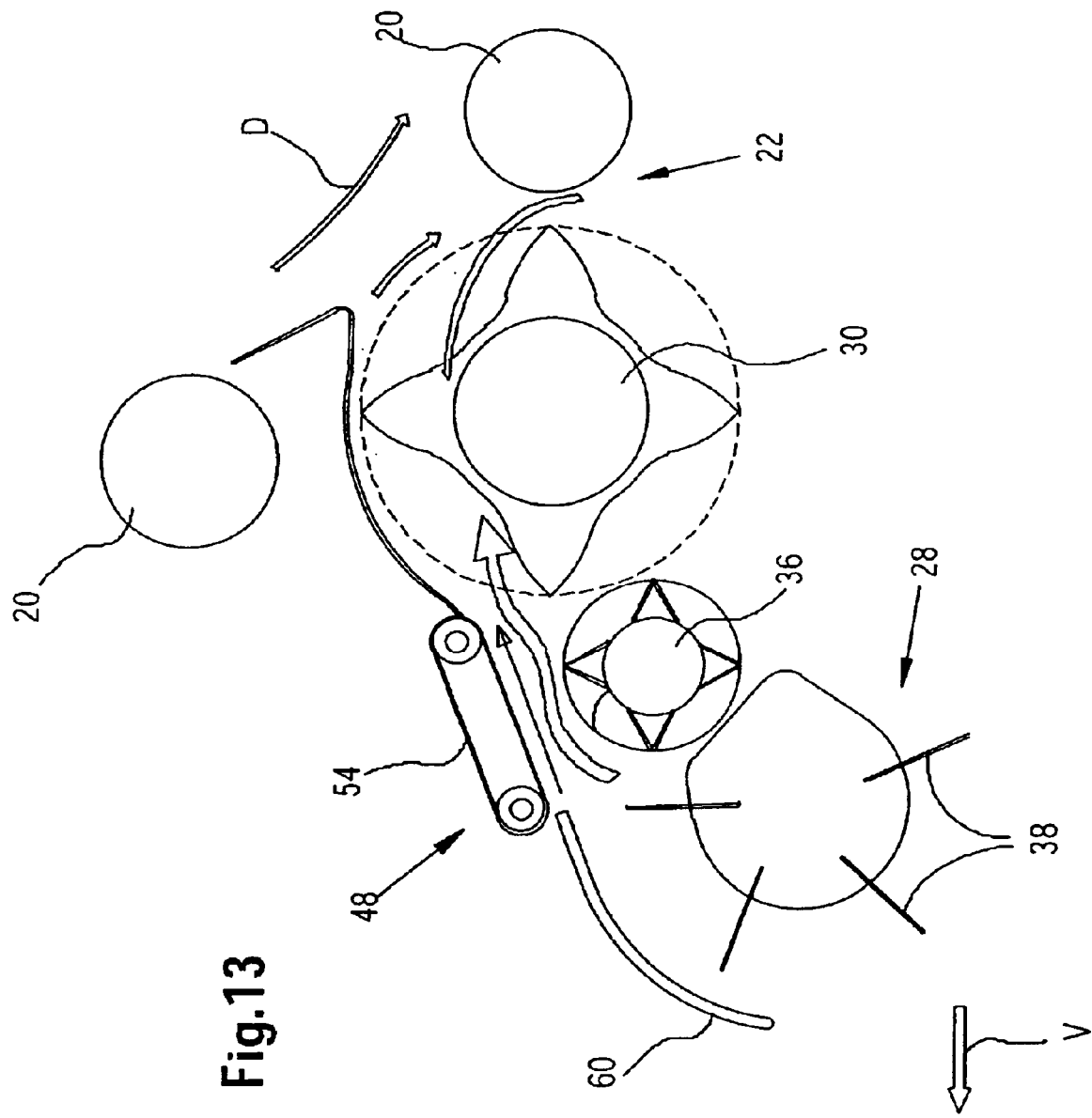
Figure 14:
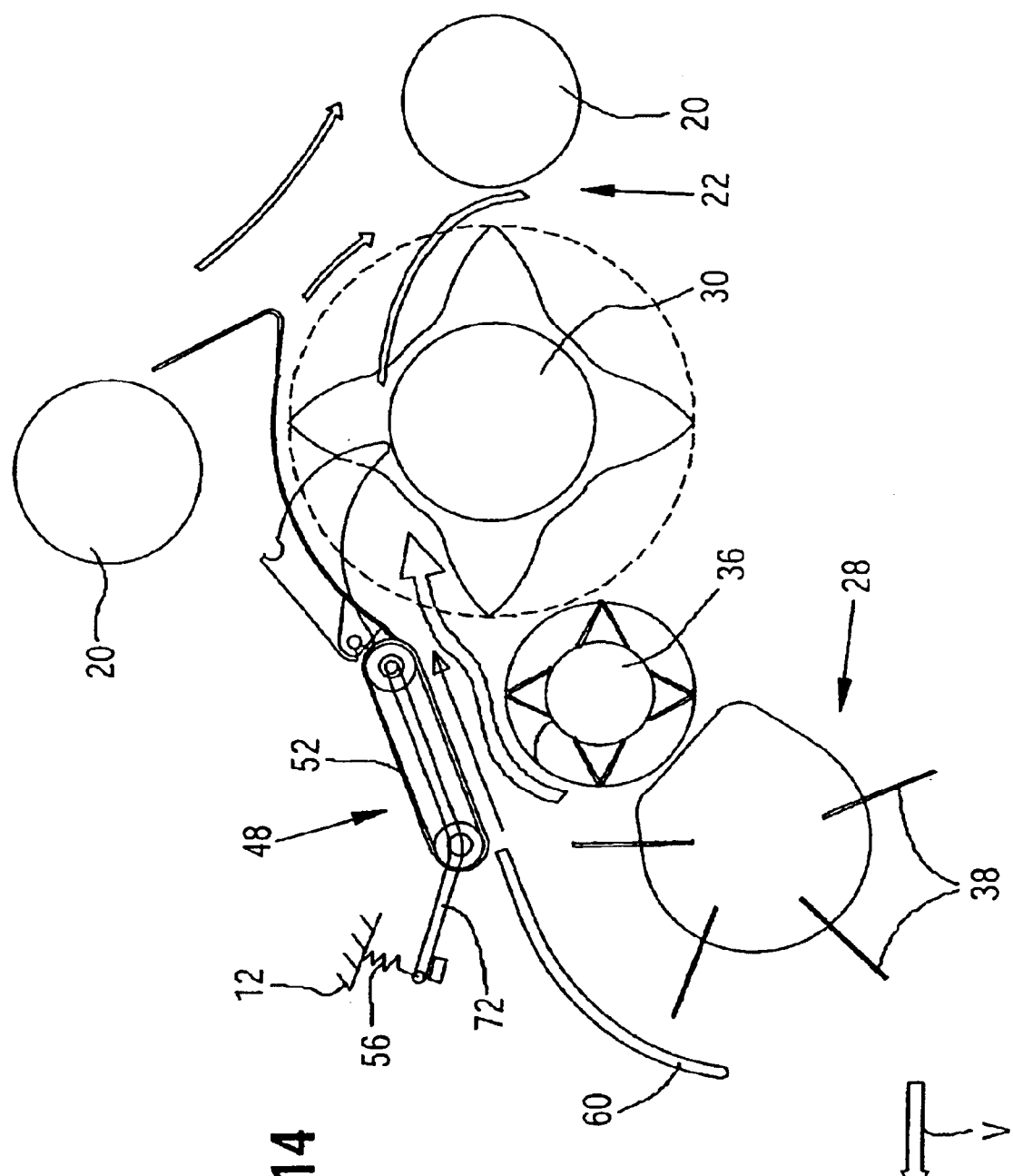

An embodiment with a spring-loaded roll 52 is shown in FIG. 12. A further alternative embodiment with a guide arrangement 48 that includes a conveyor belt 54, is clarified on the basis of FIG. 13. In the embodiments according to FIGS. 12 and 13, the rotor 30 is not part of a cutting arrangement, but is used solely for conveying. On a side facing the conveying arrangement, the conveyor belt 54 is provided with the same conveying direction F as the harvested crop. The conveyor belt 54 may either be driven actively and thereby improve the flow of the crop or it may be driven by the harvested crop itself. The conveyor belt 54 may either be arranged rigidly, as shown in FIG. 13, or it may be provided with a spring-loaded support 72, as shown in FIG. 14, and thereby apply a variable contact force to the harvested crop. Here too, the spring 56 is supported on the frame 12.

Figure 15:
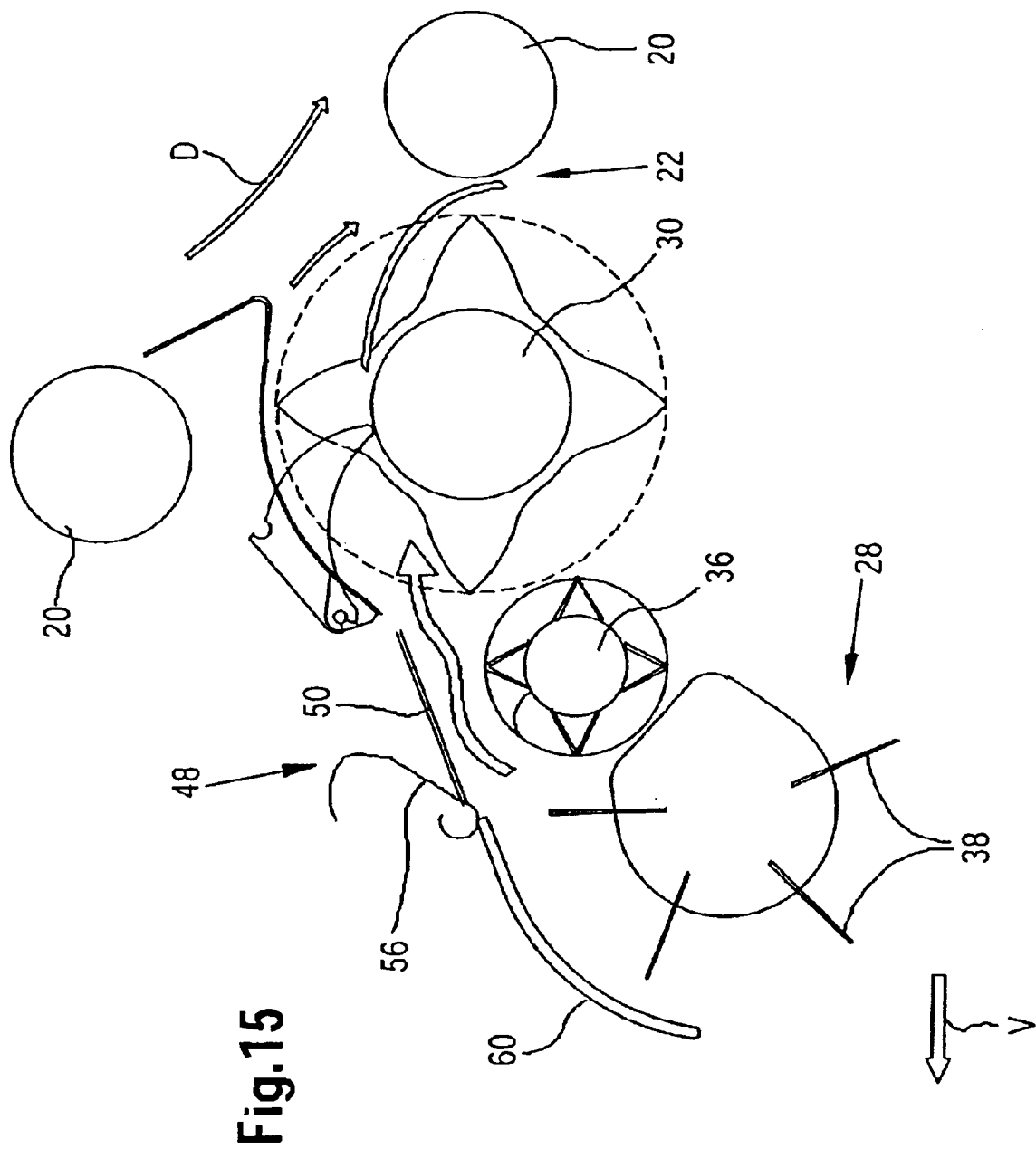

FIG. 15 also shows a variation in which a flap 50 is forced in the direction of the second rotor 36, again with a spring 56 configured as a contact pressure spring, and in this way can apply a variable contact force to the conveyed harvested crop.

Figure 16:
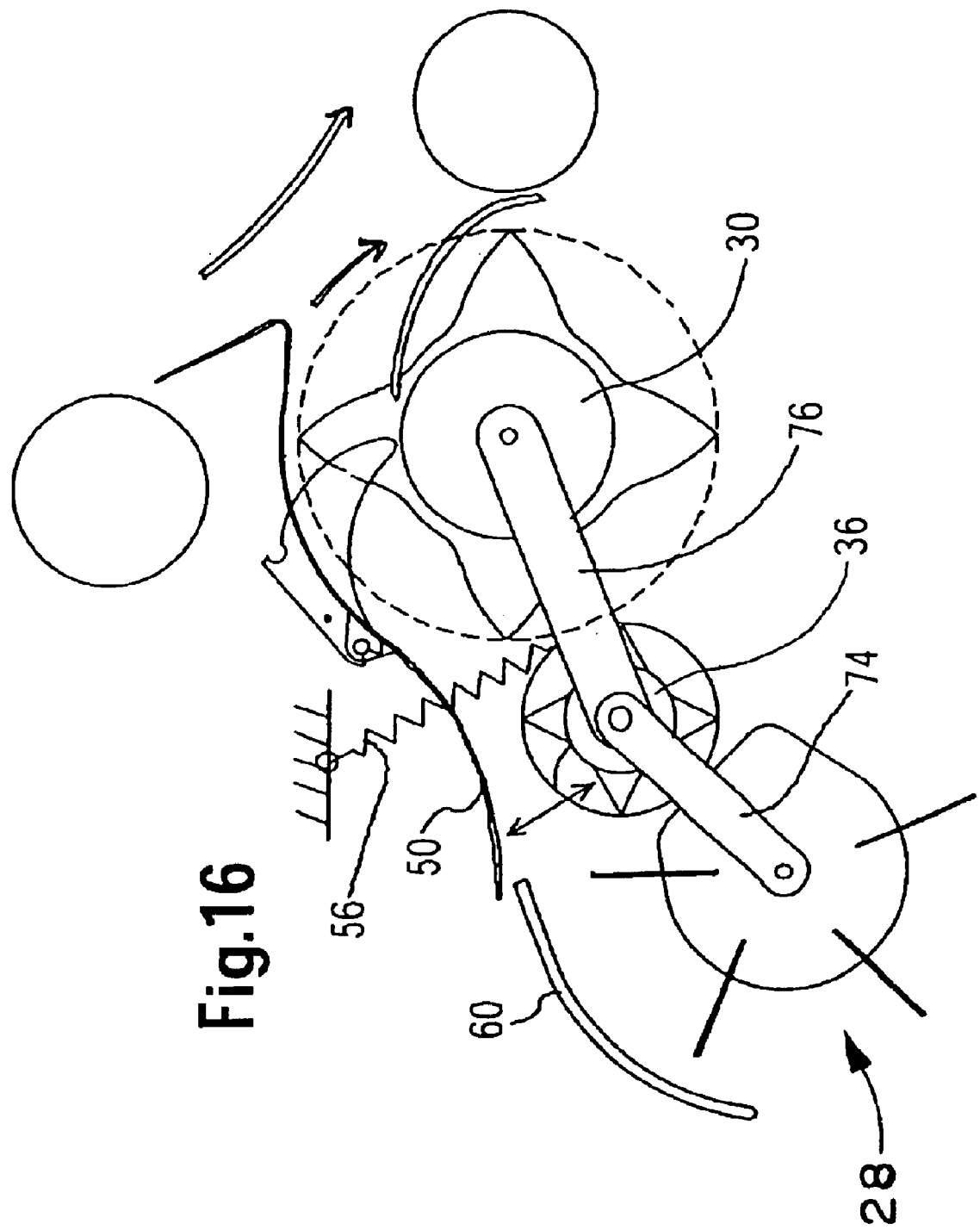
Figure 17:
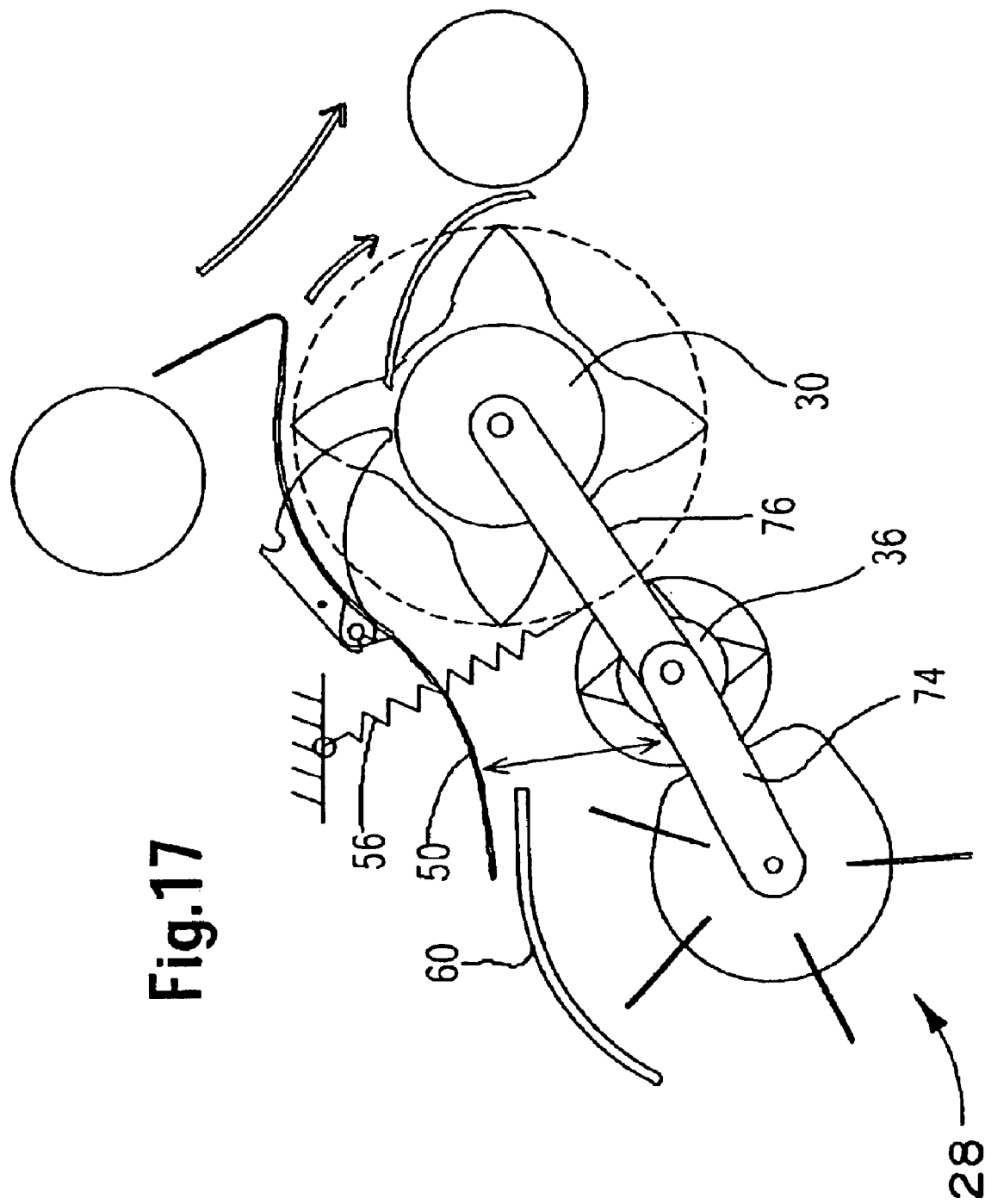

In FIGS. 16 and 17, the flow of the crop is also conducted by means of a guide arrangement 48 between both rotors 30 and 36. Nevertheless, a compression or guidance is performed not by means of a repositioning of the guide arrangement 48, but due to the fact that the second rotor 36 can be moved transverse to the flow of the crop with a spring force applied to it.

Fundamentally, the second rotor 36 could be pivoted vertically (in a way not shown) either on arms in the region of the first rotor 30, for example, about its axis of rotation or on arms in the region of the crop take-up arrangement 28 against or on the basis of the force of a spring 56 configured as an extension spring, and thereby narrow or widen the crop conveying channel. Furthermore, other possibilities are conceivable, for example, a straight-line guidance.

In the embodiment shown, the crop take-up arrangement 28 can be pivoted vertically by means of arms 74 about the axis of rotation of the second rotor 36, and the second rotor 36 is supported in bearings so as to move upward by means of arms 76 about the axis of rotation of the first rotor 30. It is obvious, that on the basis of the pivoting movement of the arms 74, 76, the second rotor 36 and the crop take-up arrangement 28 perform not only a movement transverse to the flow of the crop, but also a movement along the direction of the flow of the crop. Although it is not shown, this lengthwise movement is made possible by the crop take-up arrangement 28 that is supported in a floating manner and can also move along in the direction of the flow of the crop. Furthermore, the arm 74 can be connected rigidly with the crop take-up arrangement 28, so that this along with its guide vane 60 changes its inclination during its pivoting process about the axis of the second rotor 36. In this case, in the position according to FIG. 16 in which the flow of the crop is narrowed, a rear edge of the guide vane 60 accordingly is located further away from the first rotor 30 than in the position according to FIG. 17. The spring 56 is arranged and tensioned in such a way that it moves the second rotor 36 at all times into the position that narrows the flow of the crop.

Having described the preferred embodiment, it will become apparent that various modifications can be made without departing from the scope of the invention as defined in the accompanying claims.

What is claimed is:

1. In a crop recovery machine including a crop receptacle, an inlet leading into a lower region of said receptacle, a crop take-up arrangement located upstream of a first overshot rotor that conveys crop directly into said inlet, the improvement comprising: said first overshot rotor having a width less than that of said crop take-up arrangement and being a cutting rotor having axially spaced apart plates and having a circumferential region that reaches at least approximately to a lower region of said receptacle; a cutting knife assembly including a plurality of cutting knives mounted for cooperating with said plates to cut crop into short lengths; a second overshot rotor having a width substantially equal to that of said crop take-up arrangement and being mounted between said crop take-up arrangement and said first overshot rotor; and said second overshot rotor including opposite outer end sections defined by transverse conveyors.

2. The crop recovery machine, as defined in claim 1, wherein said outer end sections of said second overshot rotor are each configured as one of a screw conveyor and a helical bridge.

3. The crop recovery machine, as defined in claim 2, wherein said second overshot rotor includes a central section having drivers attached thereto.

4. The crop recovery machine, as defined in claim 3, wherein said drivers are configured as one of fingers, driver tines, driver bridges, and paddles.

5. The crop recovery machine, as defined in claim 3, wherein said drivers are configured as screw helices.

6. The crop recovery machine, as defined in claim 3, wherein at least said outer end sections of said second overshot rotor are driven.

7. The crop recovery machine, as defined in claim 6, wherein said outer end sections of said second overshot rotor are mounted for being driven separately from said central section.

8. The crop recovery machine, as defined in claim 1, wherein said second rotor consists only of said opposite outer end sections.

9. The crop recovery machine, as defined in claim 1, wherein a guide arrangement is arranged spaced from and located at least directly above said second overshot rotor.

10. The crop recovery machine, as defined in claim 9, wherein said guide arrangement is mounted for resilient yieldable movement away from said second overshot rotor.

11. The crop recovery machine, as defined in claim 10, wherein said guide arrangement is configured as one of a flap, roll, and conveyor belt.

12. The crop recovery machine, as defined in claim 1, wherein said second overshot rotor is mounted for movement relative to said crop take-up arrangement and said first overshot rotor in a direction transverse to a flow of crop conveyed by said crop take-up arrangement and said second overshot rotor.

13. The crop recovery machine, as defined in claim 1, wherein said machine is a large round baler and said receptacle is a baling chamber; and said first overshot rotor reaching at least to a circumference of a lower region of said baling chamber.

* * * * *